US009636639B2

(12) United States Patent
Ansari et al.

(10) Patent No.: US 9,636,639 B2
(45) Date of Patent: May 2, 2017

(54) POROUS METALLIC MEMBRANE (71) Applicant: Agency for Science, Technology and Research, Singapore (SG)

(72) Inventors: Kambiz Ansari, Singapore (SG); Shilin Chen, Singapore (SG); Christina Yuan Ling Tan, Singapore (SG); Isabel Rodriguez, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 0 days.

(21) Appl. No.: 14/654,768

(22) PCT Filed: Dec. 23, 2013

(86) PCT No.: PCT/SG2013/000546
§ 371 (c)(1),
(2) Date: Jun. 22, 2015

(87) PCT Pub. No.: WO2014/098774
PCT Pub. Date: Jun. 26, 2014

(65) Prior Publication Data
US 2015/0343390 A1    Dec. 3, 2015

(30) Foreign Application Priority Data

Dec. 21, 2012  (SG) .............................. 201209493-4

(51) Int. Cl.
*B01D 39/00*    (2006.01)
*B01D 39/14*    (2006.01)
(Continued)

(52) U.S. Cl.
CPC ......... *B01D 71/022* (2013.01); *B01D 53/228* (2013.01); *B01D 61/025* (2013.01);
(Continued)

(58) Field of Classification Search
CPC .............. B01D 71/022; B01D 67/0062; B01D 61/025; B01D 61/145; B01D 53/228
See application file for complete search history.

(56) References Cited

U.S. PATENT DOCUMENTS 3,594,134 A * 7/1971 Russell et al. ..... B01D 39/2027
164/125
4,372,806 A * 2/1983 Vossen, Jr. ........ H01L 21/02071
101/459
(Continued)

FOREIGN PATENT DOCUMENTS

EP    2405033    1/2012
GB    2320724    7/1998
(Continued)

OTHER PUBLICATIONS

"International Application No. PCT/SG2013/000546, International Preliminary Report on Patentability dated Oct. 29, 2014", (Oct. 29, 2014), 8 pgs.

(Continued)

*Primary Examiner* — Ana Fortuna
(74) *Attorney, Agent, or Firm* — Schwegman Lundberg & Woessner, P.A.

(57) ABSTRACT

The present disclosure relates to a method of forming a metallic layer having pores extending therethrough, the method comprising the steps of: (a) contacting a cathode substrate with an electrolyte solution comprising at least one cation; reducing the cation to deposit the metallic layer on a surface of the cathode substrate; and (c) generating a plurality of non-conductive regions on the cathode substrate surface during reducing step (b); wherein the deposition of the metallic layer is substantially prevented on the non-conductive regions on the cathode substrate surface to thereby form pores extending through the deposited metallic layer. The present disclosure further provides a metallic porous membrane fabricated by the disclosed process.

13 Claims, 10 Drawing Sheets (51) Int. Cl.
*B01D 67/00* (2006.01)
*B01D 71/02* (2006.01)
*B01D 69/06* (2006.01)
*B01D 53/22* (2006.01)
*B01D 61/02* (2006.01)
*B01D 61/14* (2006.01)
*B01D 69/02* (2006.01)
*B01D 69/10* (2006.01)
*C25D 1/08* (2006.01)
*C25D 3/12* (2006.01)
*C25D 5/00* (2006.01)
*C25D 5/02* (2006.01)
*C25D 7/12* (2006.01)

(52) U.S. Cl.
CPC ....... *B01D 61/145* (2013.01); *B01D 67/0053* (2013.01); *B01D 67/0062* (2013.01); *B01D 67/0069* (2013.01); *B01D 69/02* (2013.01); *B01D 69/06* (2013.01); *B01D 69/10* (2013.01); *B01D 69/105* (2013.01); *C25D 1/08* (2013.01); *C25D 3/12* (2013.01); *C25D 5/003* (2013.01); *C25D 5/022* (2013.01); *C25D 7/123* (2013.01); *B01D 2325/021* (2013.01)

(56) References Cited

U.S. PATENT DOCUMENTS

| | | | | |
|---|---|---|---|---|
| 4,575,406 A | | 3/1986 | Slafer | |
| 5,632,878 A | * | 5/1997 | Kitano | C25D 1/10 205/112 |
| 5,728,284 A | * | 3/1998 | Oyama | C25D 1/08 205/170 |
| 5,798,148 A | * | 8/1998 | Thomas | B01J 37/349 427/250 |
| 5,804,053 A | * | 9/1998 | Vaccaro | C25D 5/54 204/206 |
| 6,027,630 A | | 2/2000 | Cohen | |
| 6,610,190 B2 | | 8/2003 | Basol et al. | |
| 7,066,398 B2 | * | 6/2006 | Borland | B05B 17/0638 239/102.2 |
| 7,733,397 B2 | * | 6/2010 | Lu | G06K 9/209 348/264 |
| 7,875,154 B2 | * | 1/2011 | Park | B01D 67/0069 204/192.1 |
| 9,074,293 B2 | * | 7/2015 | Sung | C25D 1/08 |
| 2003/0190486 A1 | * | 10/2003 | Roa | H01M 8/0668 428/469 |
| 2007/0029251 A1 | * | 2/2007 | Lee | B01D 67/0041 210/500.25 |
| 2007/0034518 A1 | | 2/2007 | Gorrell et al. | |
| 2008/0038567 A1 | * | 2/2008 | Way | B01D 53/228 428/457 |
| 2008/0116078 A1 | * | 5/2008 | Park | B01D 67/0069 205/161 |
| 2010/0075053 A1 | * | 3/2010 | Stremsdoerfer | C23C 18/1617 427/299 |
| 2011/0167897 A1 | * | 7/2011 | Huang | G01N 15/088 73/38 |
| 2015/0148436 A1 | * | 5/2015 | Small | B01D 69/02 521/53 |
| 2015/0343390 A1 | * | 12/2015 | Ansari | B01D 71/022 210/500.25 |

FOREIGN PATENT DOCUMENTS

| | | |
|---|---|---|
| WO | WO-2012/082717 | 6/2012 |
| WO | WO-2014/098774 | 6/2014 |

OTHER PUBLICATIONS

"International Application No. PCT/SG2013/000546, International Search Report mailed Feb. 27, 2014", (Feb. 27, 2014), 20 pgs.

* cited by examiner

POROUS METALLIC MEMBRANE

PRIORITY CLAIM TO RELATED APPLICATIONS

This application is a U.S. national stage application filed under 35 U.S.C. §371 from International Application Serial No. PCT/SG2013/000546, which was filed 23 Dec. 2013, and published as WO 2014/098774 on 26 Jun. 2014, and which claims priority to Singapore Application No. 201209493-4, filed 21 Dec. 2012, which applications and publication are incorporated by reference as if reproduced herein and made a part hereof in their entirety, and the benefit of priority of each of which is claimed herein.

TECHNICAL FIELD

The present invention generally relates to a porous metallic membrane and a process for making the same.

BACKGROUND

Porous metallic membranes are of great interest and high demand in industry. Their applications range from hydrogen storage, gas filtration such as hydrogen purification, fuel cell technology, membrane reactor processes and environmental water filtration.

Metallic membranes address a number of drawbacks associated with porous polymer membranes. For instance, due to the methods used in their production, polymer membranes typically contain truncated, irregular pores with large variations in pore sizes and face limitations in the control of pore dimension and geometry. Specifically, a polymer membrane may be composed of multiple layers, wherein the pores of each layer are not aligned with the pores of an adjacent layer, resulting in an irregular path for filtrate movement. Furthermore, at least one or more layers may possess pores in the nano-scale dimension. These factors can cause the polymer membrane to exhibit high flow resistance. As a result, polymer membranes typically offer lower selectivity and flux relative to metallic membranes. Furthermore, membranes made from polymer materials are not able to operate under harsh environments (such as high pressure conditions) without impairment to its separation quality or suffering damage to its structure.

In comparison, the use of metallic materials to manufacture porous metal membranes is advantageous. For example, when applied to the synthesis of a fuel cell, metallic membranes provide an attractive combination of electrical conductivity, higher flux, efficiency, selectivity and mechanical durability when compared to a polymer membrane.

At present, palladium or palladium alloys are commonly used in the synthesis of porous metal membranes, e.g., for hydrogen gas filtration and storage. In particular, palladium and its alloys are selected for their good permeability to hydrogen and further because palladium does not experience embrittlement at high hydrogen partial pressures. However, the scarcity of palladium makes it an expensive raw material and renders it prohibitively expensive to use in large scale manufacture of metallic membranes.

Apart from cost, the current processes available in the art for forming metallic membranes are also non-optimal. For instance, one known process for fabricating metallic membranes is electroless plating. However, a drawback of this process is that there is wastage of the material that is to be plated. For instance, metal that precipitates out of solution may not be deposited on the substrate metal. Instead, precipitated metal may collect in the electroless bath in the form of particulate dust or may even deposit onto surfaces other than the desired substrate metal, such as the surface of the container holding the plating bath.

Another process that has been used to prepare metal membranes is sputtering. However, sputtering requires stringent control of the process conditions (e.g. vacuum), and is more suited for depositing thin layers over small surface areas. Furthermore, it is a relatively slow process compared to electroless plating, making it impractical for use in large-scale manufacturing. The high temperature conditions used in the sputtering process further renders it unsuitable for depositing metals on substrates having low melting points.

Traditional electroplating processes combined with UV lithography techniques create smooth, highly uniform membranes with high resolution. However, a major drawback is the high cost of such processes. Known UV lithography techniques can produce pore sizes of several microns or less, while deep UV lithography techniques can produce even smaller pores, but these techniques are also very costly. In addition, membranes generated by UV lithography techniques are limited to having cylindrically shaped pores.

In environmental filtration applications, large volumes of sample have to be filtrated with high precision. Membranes with even one pore slightly bigger than the rest can allow contaminants to pass through. Thus, there is a need to synthesize porous membranes with high flux, and high degrees of precision. Thus, there is a need to develop a process that allows for control of the geometry and size of the pores of porous membranes.

As such, there is a need to provide a process that provides porous metal membranes that overcome, or at least ameliorate, one or more of the disadvantages described above.

SUMMARY

According to a first aspect, there is provided a method of forming a metallic layer having pores extending therethrough, the method comprising the steps of: (a) contacting a cathode substrate with an electrolyte solution comprising at least one cation; (b) reducing said cation to deposit the metallic layer on a surface of said cathode substrate; and (c) generating a plurality of non-conductive regions on the cathode substrate surface during reducing step (b); wherein the deposition of the metallic layer is substantially prevented on said non-conductive regions on the cathode substrate surface to thereby form pores extending through the deposited metallic layer.

In one embodiment, step (c) comprises a step of reducing an electron acceptor species contained within the electrolyte solution to dispose a non-conductive material on the cathode substrate surface to thereby generate the non-conductive regions. In embodiments, the non-conductive material may assume the form of a gas bubble. In particular embodiments, the gas bubble is comprised of hydrogen.

Advantageously, the disclosed method provides means for controlling a side reaction of the electroplating process (i.e., hydrogen generation at the cathode) to create non-conductive regions on the cathode substrate surface. Since there would be substantially no metallic deposition occurring on the non-conductive regions, the result is the development of pores extending throughout the entire thickness of the deposited metallic layer. Advantageously, the pores are defined by continuous, non-truncated channels extending from one side of the metal layer to an opposite side of the metallic layer. Also advantageously, the disclosed method provides means for controlling the pore geometry, pore channel geometry, pore size, and pore density of the formed metallic membrane.

Firstly, the disclosed method provides a means for varying the size of the non-conductive regions on the cathode substrate surface. In one embodiment, this is accomplished by varying the size of the hydrogen bubble disposed on the cathode substrate surface. One advantage of this method is that it is possible to precisely adjust the size of the hydrogen bubble by manipulating the electroplating parameters, thereby achieving precise control over the pore size of the formed metallic membrane. In one embodiment, the disclosed method is capable of generating pore sizes in the range of from 200 nm to 20 microns.

In another embodiment, the present method can be utilized to generate various pore shapes, including but not limited to, oval, circular, rectangular, hexagonal, and triangular shapes. In one embodiment, the shape of the pore is modified by adjusting the shape of the non-conductive region on the cathode substrate surface. In another embodiment, differing pore shapes may be formed by providing at least one removable or patternable material on the cathode substrate surface, and wherein the patterned material cooperates with one or more non-conductive regions to form a desired pore geometry.

Secondly, by varying the size of the non-conductive region as electroplating progresses, the disclosed method also allows precise control in the geometry of the pore channel. In one embodiment, the size of the hydrogen bubble is incrementally enlarged as the metallic deposition progresses, resulting in the formation of a pore channel that has tapered side walls. In one embodiment, the tapered side walls may show a step-wise profile. In one embodiment, it is preferred to form pores that are tapered or funnel-shaped, wherein the opening at one end of the pore channel is relatively larger that the opening at the opposite end of the pore channel. Advantageously, a tapered pore channel is capable of reducing pressure drop across the metallic membrane when a fluid is passed through.

Thirdly, the disclosed method further allows precise control over the pore density. In one embodiment, the pore density can advantageously be controlled by adjusting the electroplating conditions to generate a desired number of hydrogen bubbles per, unit area of the cathode substrate surface.

Fourthly, the disclosed method advantageously allows the reproducibility of pore size. In particular, the present method is capable of fabricating pores that are substantially uniform in size. This is important since membranes with huge variation in pore sizes would display poor selectivity. In one embodiment, at least 70%, to 99.9% of the pores formed are less than 3 microns in diameter.

In another aspect, there is provided a porous membrane comprising a plurality of pore channels extending therethrough, each pore channel comprising a first opening having a first pore size disposed at one side of the porous membrane, and a second opening having a second pore size disposed at an opposite side of said membrane, wherein the second pore size is greater than the first pore size.

In one embodiment, the porous membrane above is fabricated according to the method of the present invention.

DEFINITIONS

The following words and terms used herein shall have the meaning indicated:

The term "non-conductive region", as used in the context of the present specification, is intended to refer to a region occurring on a cathode substrate where electron passage does not substantially take place, preventing the reduction of cations in contact with the region.

The word "substantially" does not exclude "completely" e.g. a composition which is "substantially free" from Y may be completely free from Y. Where necessary, the word "substantially" may be omitted from the definition of the invention.

Unless specified otherwise, the terms "comprising" and "comprise", and grammatical variants thereof, are intended to represent "open" or "inclusive" language such that they include recited elements but also permit inclusion of additional, unrecited elements.

As used herein, the term "about", in the context of concentrations of components of the formulations, typically means+/−5% of the stated value, more typically +/−4% of the stated value, more typically +/−3% of the stated value, more typically, +/−2% of the stated value, even more typically +/−1% of the stated value, and even more typically +/−0.5% of the stated value.

Throughout this disclosure, certain embodiments may be disclosed in a range format. It should be understood that the description in range format is merely for convenience and brevity and should not be construed as an inflexible limitation on the scope of the disclosed ranges. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Certain embodiments may also be described broadly and generically herein. Each of the narrower species and sub-generic groupings falling within the generic disclosure also form part of the disclosure. This includes the generic description of the embodiments with a proviso or negative limitation removing any subject matter from the genus, regardless of whether or not the excised material is specifically recited herein.

DETAILED DISCLOSURE OF EMBODIMENTS

Exemplary, non-limiting embodiments of a method of forming a metallic layer will now be disclosed. In one embodiment, the disclosed method comprises the steps of: (a) contacting a cathode substrate with an electrolyte solution comprising at least one cation; (b) reducing the cation to deposit the metallic layer on a surface of the cathode substrate; and (c) generating a plurality of non-conductive regions on the cathode substrate surface during reducing step (b); wherein the deposition of the metallic layer is substantially prevented on said non-conductive regions on the cathode substrate surface to thereby form pores extending through the deposited metallic layer.

In one embodiment, step (c) comprises a step of reducing an electron acceptor species contained within said electrolyte solution to dispose a non-conductive material on the cathode substrate surface to thereby generate the non-conductive regions. The non-conductive material may comprise a hydrogen gas bubble. The electron acceptor species may be an ionic compound formed due to the oxidation of water. The electron acceptor species may be any ionic compound capable of accepting electrons to cause the generation of a gaseous species. The electron acceptor species may be selected from ionic species of the group consisting of: NiCo, Cu, Zn, Pt, Mo, Ti, Ag, Cr, Au, Pd and alloys thereof. In another embodiment, the electron acceptor species is a hydrogen ion ($H_3O^+$). In particular, under selected electroplating conditions, the $H_3O^+$ ions present in the electrolyte bath can be reduced to form hydrogen gas and water at the cathode substrate surface to thereby generate hydrogen bubbles adhering on the cathode surface.

The method may further comprise maintaining said electrolyte at a pH of between 2.5 to 4.0. In other embodiments, the pH of the electrolyte can be maintained at a value selected from the group consisting of: 2.5, 2.6, 2.7, 2.8, 2.9, 3.0, 3.1, 3.2, 3.3, 3.4, 3.5, 3.6, 3.7, 3.8, 3.9 and 4.0. In other embodiments, a pH range combining any two or more of the above values can be provided. In one embodiment, the pH is to be maintained at about 3.0 to 3.5. Advantageously, it has been found that maintaining the electrolyte pH at between 3.0 to 3.5 results in densely distributed pores while maintaining the electroplating bath close to its normal conditions (such as those provided under Example 1).

In one embodiment, the pore density is at least from 0.3 pores per $\mu m^2$ to 0.8 pores per $\mu m^2$. In embodiments, the pore density may be selected from the group consisting of: 0.3 pores per $\mu m^2$, 0.4 pores per $\mu m^2$, 0.5 pores per $\mu m^2$, 0.6 pores per $\mu m^2$, 0.7 pores per $\mu m^2$, and 0.75 pores per $\mu m^2$. In embodiments, the pore size of the said membrane may be selected from the group consisting of: 0.01 $\mu m$, 0.05 $\mu m$, 0.1 $\mu m$, 0.5 $\mu m$, 1.0 $\mu m$, 1.5 $\mu m$, 2.0 $\mu m$, 2.5 $\mu m$, 3.0 $\mu m$, 3.5 $\mu m$, 4.0 $\mu m$, 4.5 $\mu m$, 5.0 $\mu m$, 10.0 $\mu m$, 12.0 $\mu m$, 15.0 $\mu m$, 18.0 $\mu m$ and 20 $\mu m$. In one embodiment, it is preferred that the pore size is from 0.02 $\mu m$ to 3.0 $\mu m$.

In embodiments, the disclosed method may comprise maintaining the electroplating at constant conditions. Advantageously, this has the effect of achieving uniformity in pore formation, where the pore sizes fall within a narrow size distribution, e.g., from within ±5% to ±1% of the pore diameter. That is, in a membrane prepared according to the disclosed method, the variation in pore diameters throughout the membrane is not greater than ±1%. In one embodiment, the method may further comprise passing a constant current flow through the electrolyte. This step may involve continually monitoring the current flow and adjusting voltage conditions appropriately to achieve a substantially constant current density. In another embodiment, the method also comprises simply maintaining a constant, localized current density about the cathode substrate surface. The method may further comprise maintaining a constant concentration of the cations in the electrolyte solution. Cations that have been depleted due to deposition on the cathode surface may be replenished in the electrolyte bath, for instance, by dissolution from an anode end. In this case, the anode may be composed of a metallic material/metal that can dissolve to form the cations in the electrolyte bath.

The method may comprise providing a current density that is localized at said cathode of between 1.0 to about 60 $A/dm^2$. In one embodiment, where the substrate is a silicon wafer, a current density of 1.0 to 12 $A/dm^2$ may be applied. In embodiments, the current density, where the substrate is a silicon wafer, may be selected from the group consisting of: 1.0, 1.5, 2, 3, 4, 5, 6, 7, 8, 9, 10, 11 and 12 $A/dm^2$. In another embodiment, where the substrate is quartz, a localized current density of from about 12 to about 60 $A/dm^2$ may be applied. In embodiments, the current density, where the substrate is quartz, may be selected from the group consisting of: 12, 15, 20, 25, 30, 35, 40, 45, 50, 55 and 60 $A/dm^2$.

In embodiments, increasing the localized current density leads to smaller pore sizes. It was found that the generation of hydrogen bubbles was dependent on the local electric field strength. In particular, a higher electric field strength, which corresponds to more focused electric field lines, led to the formation of smaller bubbles, which resulted in the formation of membranes with smaller pores. A stronger electric field also results in a faster deposition rate of the metallic layer. Without being bound by theory, it has been postulated that the decrease in bubble diameter with increasing current density is a result of a decrease in surface wettability of the substrate, that is, the decrease in the contact angle between the bubble and substrate surface. The smaller contact angle may either keep the bubble small or cause the bubble to break-off from the surface. If the bubble breaks off, the substrate surface is exposed for electroplating, resulting in cavity formation. However, if the bubble remains on the substrate surface, a cone-shaped pore will be formed.

The cation contained in the electrolyte may be selected from monovalent, divalent, trivalent or tetravalent ions of a metallic material selected from the group consisting of gold, palladium, platinum, silver, molybdenum, titanium, cobalt, copper, nickel, zinc, brass, solder and alloys thereof. In embodiments, the electrolyte may be selected from the group consisting of: nickel sulfamate, nickel chloride, nickel sulfate and mixtures thereof. In one embodiment, the electrolyte is nickel sulfamate. One or more inorganic acids may be provided within the electrolyte. In one embodiment, the inorganic acid may be boric acid. In embodiments, more than one metal or metallic alloy may be deposited in succession to form a multi-layered membrane. In embodiments, a protective metal layer may be deposited over the formed membrane to enhance the scratch resistance and mechanical strength of the metallic membrane. In one embodiment, the cation is divalent nickel.

The disclosed method may further comprise a step of disposing at least one removable material on said cathode substrate surface, such as a patternable material. The patternable material may be suitably patterned to cooperate with the non-conductive material or region to define a desired geometry/shape for pore formation. The patternable material may be a conductive material, which is capable of having a metallic/metal deposited thereon during the electroplating process.

In another embodiment, the patternable material may comprise a photoresist. The photoresist may be a positive resist or a negative resist. One or more surfaces of the patterned photoresist may be coated with a conductive material. The patterned photoresist may be surface-coated with a conductive material, such that electroplating may occur over the conductive surface enveloping the photoresist. In embodiments, the photoresist may be patterned using UV lithography, deep UV lithography, x-ray lithography, e-beam or ion beam techniques, or nano-imprint lithography (e.g. stamping techniques). Advantageously, the patterned photoresist may cooperate with the hydrogen bubble to confine the bubbles within the patterns of the photoresist. During electroplating, the bubbles prevent electroplating within the patterns, resulting in the formation of pores having shapes based on the geometry of the patterns. In one embodiment, the electroplating is carried out only up to the top of the patterns. In this case, the thickness of the membranes is defined by the thickness of the photoresist.

To provide additional structural strength, one or more support layers can be electroplated over the deposited metallic membrane layer. The support layer may have pores that are the same size or slightly larger relative to the pores of the membrane layer. In embodiments, the support layer has pore dimensions of 50 μm×50 μm, 100 μm×100 μm 600 μm×600 μm, 1 mm×1 mm or 1.5 mm×1.5 mm. The support layer may have a thickness of from 50 to 200 nm. In one embodiment, the thickness of the support layer may be selected from the group consisting of: 50 μm, 100 μm, 150 μm, and 200 μm. Thereafter, the photoresist is removed. In one embodiment, the pore opening formed using the disclosed method is substantially rectangular.

The disclosed method may further comprise a step of removing the removable/patterned material after the deposition of the metallic layers on the cathode substrate surface. In one embodiment, the method comprises a step or removing the photoresist by immersing the formed membrane into a solvent wash comprising the appropriate photoresist remover such as acetone or piranha solution.

In embodiments, the cathode substrate comprises a conductive layer disposed on a silicon wafer substrate. The conductive layer may be selected from any suitable electrically conductive material. In one embodiment, the conductive layer is nickel, chromium, gold, or their alloys thereof. In other embodiments, the cathode substrate surface comprises an uneven surface. The uneven surface may comprise needle-like projections. In embodiments, the needle-like projections may have a diameter in a range selected from 1 nm to 10 μm. In embodiments, the needle-like projections may have a diameter in a range selected from the group of: from 10 nm to 200 nm, from 10 nm to 150 nm, from 10 to 100 nm, from 10 to 50 nm, from 50 nm to 200 nm, from 50 nm to 100 nm, from 100 nm to 150 nm, from 100 nm to 200 nm, and from 150 nm to 200 nm. In one embodiment, the needle-like projections have a diameter of from about 50 nm to 150 nm. In one embodiment, the uneven surface may comprise needle-like projections having a diameter of less than 100 nm. Advantageously, the sharp tips of these needle-like projections serve to concentrate the electric field on the sharp tips. As a result, the electroplating current density increases at the sharp tips of the substrate, and a majority of reactions would therefore occur at these tips, thus promoting bubble formation on these points. Advantageously, the needle-like projections allow the formation of porous membranes having a high density of pores, each pore having a dimension equal to the tip of the needles, i.e., from micron size to sub-100 nm. In one embodiment, the substrate is a black silicon substrate. Black silicon technology can etch high density nano-scale Si pillars on the surface of the Si wafer with high aspect ratios of 10 or less.

In the disclosed method, the generating step (c) may comprise a step of providing a patterned conductive layer on the cathode substrate surface, wherein the patterned layer comprises a plurality of trench features having an aspect ratio of at least 3. In embodiments, the distance between one trench feature to an adjacent trench feature is from 200 nm to 3 μm. In embodiments, the distance between one trench feature to an adjacent trench feature is in a range selected from the group of: 5 μm to 200 nm. In particular, the stitch value (measured as the repeated distance from an edge of any periodic pattern to a similar edge of an adjacent similar pattern) may depend on the dimension of the periodic pattern. For illustration without limitation, where the patterned feature has a dimension (e.g. width or diameter) of 10 μm, the stitch can be 5 μm; where the patterned feature has a dimension of 2 μm, the stitch may be 1 or 2 μm; where the patterned feature has a dimension of 3 μm, the stitch can be 2 μm or 3 μm; and where the patterned feature has a dimension of 100 nm, the stitch may be 100 nm or 200 nm.

Advantageously, having an aspect ratio of at least 3 causes electroplating/metal deposition to proceed faster at the top surface of the trench feature. In one embodiment, no metal deposition occurs at either the bottom of the trenches or the side walls of the trench features. Furthermore, in this embodiment, the deposition of the metallic material may proceed faster on the top surface of the deposited metal, relative to the side walls of the deposited metal, resulting in the formation of funnel-shaped voids, such as those depicted in FIG. 7.

In one embodiment, the patterned conductive layer comprises a resist material that is substantially coated with a conductive seed layer.

In yet another embodiment of the disclosed method, the generating step (c) comprises a step of providing a patterned, non-conductive layer on the cathode substrate surface. The non-conductive layer may be a resist layer having an aspect ratio of less than 1. Advantageously, the non-conductive layer is selected such that no electroplating occurs on its surface. In this embodiment, electrically conductive regions may be provided surrounding the patterns in the non-conductive layer having an aspect ratio of less than 1. In one embodiment, the conductive regions may comprise a seed layer of Cr or Au disposed on the cathode substrate surface. In this embodiment, electroplating conditions may be selected to have optimized pH for low $H_2$ formation. Advantageously, the pH of the electrolyte is from 3.0 to 3.5, while the preferred pH is 3.0. Without being bound by theory, it has been postulated that a pH of less than 3.0 may result in the formation of high porosity membranes with multiple pores, but the plated metal may face high stress and possible buckling. On the other hand, a pH of greater than 3.6 may prevent the formation of bubbles.

Figure 10:
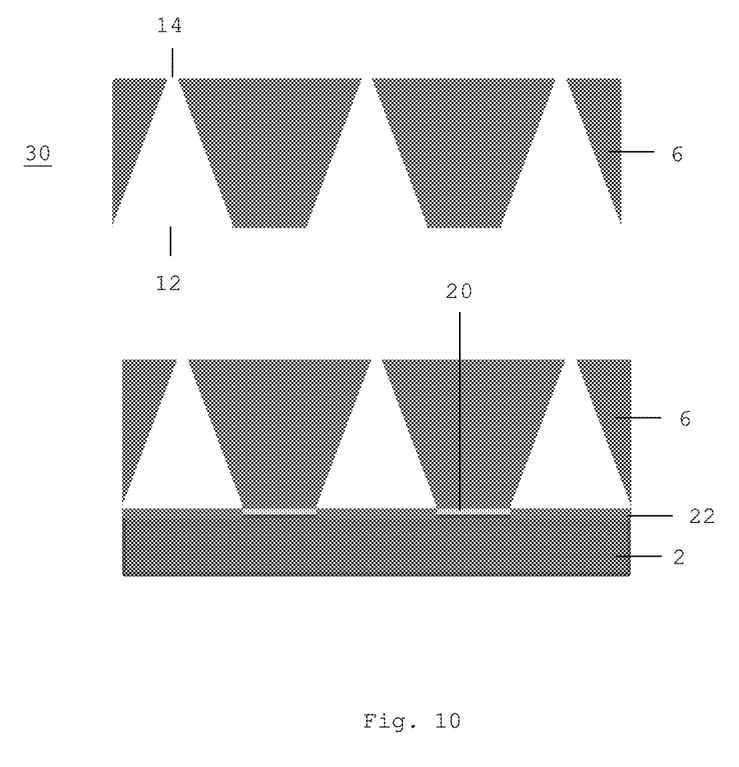
FIG. 10 is a schematic diagram depicting the formation of a porous nickel membrane by using a patterned conductive layer with low aspect ratio.

Advantageously, in this embodiment, as metallic material is being deposited on the conductive regions and grows in thickness, the side walls of the deposited metal layer grow laterally towards each other, resulting in the formation of conical shaped voids, such as those depicted in FIG. 10.

Exemplary, non-limiting embodiments of a porous membrane will now be disclosed. In one embodiment, there is provided a porous membrane comprising a plurality of pore channels extending therethrough, each pore channel comprising a first opening having a first pore size disposed at one side of the porous membrane, and a second opening having a second pore size disposed at an opposite side of said membrane, wherein the second pore size is greater than the first pore size.

The ratio of the first pore size to second pore size may be advantageously controlled and selected to reduce pressure drop of a fluid passing across the porous membrane. In embodiments, the ratio of the first pore size to the second pore size may be selected from the group consisting of: 1:5, 1:10, 1:20, 1:30, 1:40, 1:50, 1:60, 1:70, 1:80, 1:90, 1:100, 1:110, 1:120, 1:130, 1:140, and 1:150. In one embodiment, the ratio of the first pore size to the second pore size is from 1:50 to 1:100.

The first pore size may be from 0.01 μm to 20 μm in diameter. In one embodiment, the first pore size is from 0.02 μm to 3.0 μm in diameter. In other embodiments, the first pore size may be selected from the group consisting of: 0.01 μm, 0.05 μm, 0.1 μm, 0.5 μm, 1 μm, 3 μm, 5 μm, 7 μm, 9 μm, 11 μm, 13 μm, 15 μm, 17 μm, 19 μm, and 20 μm.

The porous membrane may be composed of multiple metallic layers, each layer having pores that are aligned with pores disposed on adjacent layer(s). In one embodiment, the bottom layer is the layer having pores of a first pore size as defined above. Each additional layer deposited over the bottom-most layer may have pores that are larger than the layer directly below it. In particular, the pores of an upper layer may be from 50% to 100% larger than the pores of an adjacent layer directly below, thus resulting in a gradually increasing pore size throughout the multi-layer porous membrane (i.e. cone-shaped pores). In this case, the ultimate or top most layer would be the layer having pores of the second pore size.

The pore sizes may be substantially uniform for each layer. In one embodiment, the diameters of the pores located on any particular layer are within ±5% of each other. For instance, the first pore size may be from 0.02±0.001 µm to 3.0±0.1 µm in diameter.

The porous membrane may comprise a pore density of at least 0.3 to 0.8 pores per $mm^2$. In embodiments, the pore density may be selected from the group consisting of: 0.3 pores per $\mu m^2$, 0.4 pores per $\mu m^2$, 0.5 pores per $\mu m^2$, 0.6 pores per $\mu m^2$, 0.7 pores per $\mu m^2$, and 0.75 pores per $\mu m^2$. In embodiments, the pore size of the said membrane may be selected from the group consisting of: 0.01 µm, 0.05 µm, 0.1 µm, 0.5 µm, 1.0 µm, 1.5 µm, 2.0 µm, 2.5 µm, 3.0 µm, 3.5 µm, 4.0 µm, 4.5 µm, 5.0 µm, 10.0 µm, 12.0 µm, 15.0 µm, 18.0 µm and 20 µm. In one embodiment, it is preferred that the pore size is between 0.02 µm and 3.0 µm.

In one embodiment, a fluid passing across the disclosed membrane by entering the first opening and exiting the second opening may experience a pressure drop of less than $\Delta P=2$ bar. For instance the pressure drop is applied by passing a fluid having a turbidity of around 1 NTU and at a flux of about 1.4 $kg/cm^2$ hr through the membrane and measuring the pressure differential. In embodiments, the porous membrane may be composed of a metallic material, e.g., palladium, nickel, or alloys thereof. In one embodiment, the porous membrane is composed of nickel.

BRIEF DESCRIPTION OF DRAWINGS

The accompanying drawings illustrate a disclosed embodiment and serves to explain the principles of the disclosed embodiment. It is to be understood, however, that the drawings are designed for purposes of illustration only, and not as a definition of the limits of the invention.

DETAILED DESCRIPTION OF DRAWINGS

Figure 1:
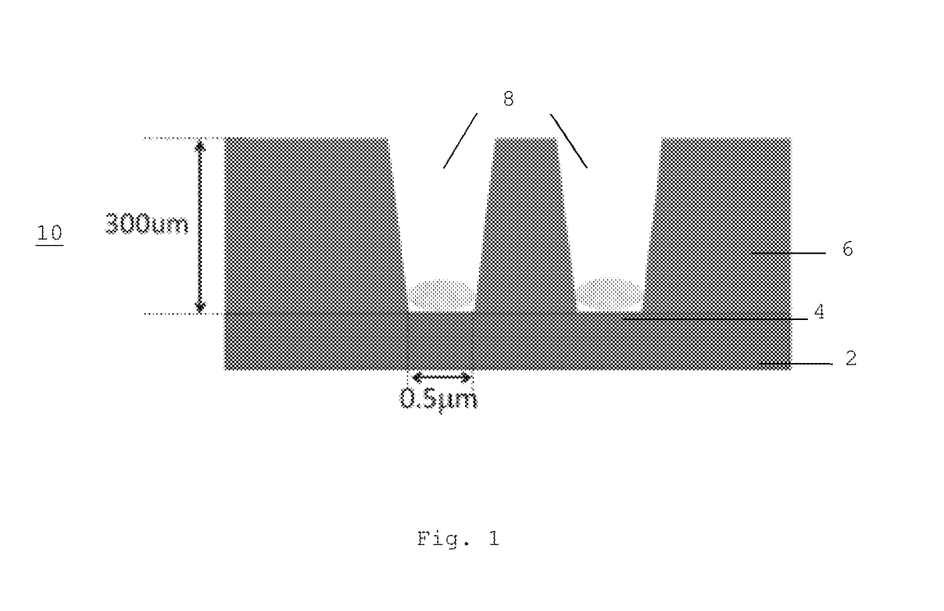
FIG. 1 is a schematic diagram depicting the formation of a porous nickel membrane.

FIG. 1 is a schematic diagram depicting the formation of a porous nickel membrane 10. A cathode substrate 2 comprising a plain metal sheet with a smooth and flat surface is used for electroplating to fabricate a porous Ni membrane 10. Evolution of hydrogen bubbles 4 during the electroplating process led to the formation of non-conductive regions on the cathode substrate surface. A nickel layer 6 is deposited on areas not covered by the non-conductive regions, thereby forming pores 8. The bubble 4, confined between the adjacent deposited Ni layer 6, may gradually enlarge as electroplating progresses. In the process, the enlarging bubble 4 may rise above the deposited Ni layer 6 to occupy a larger space. Further Ni deposition then results in the formation of a tapering pore 8. In some cases, the tapering pore 8 may exhibit a step-wise tapered profile.

Figure 3:
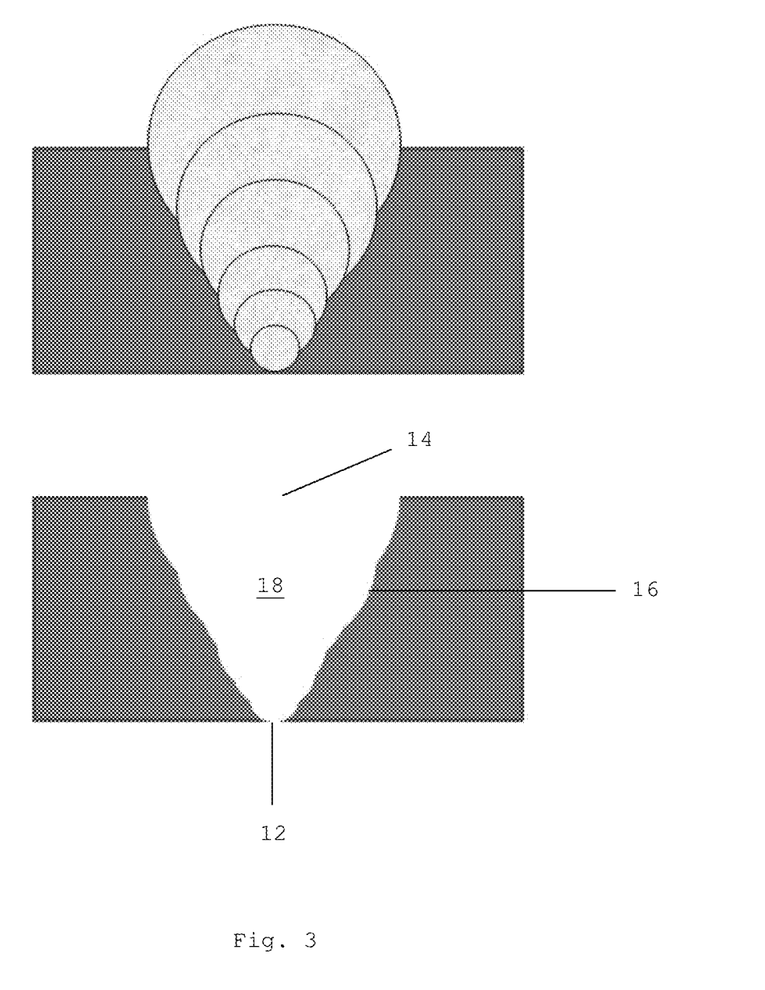
FIG. 3 is a schematic diagram depicting a pore channel.

FIG. 3 is a schematic diagram depicting a pore channel 18 in accordance with an embodiment of the present disclosure. Pore channel 18 has tapered side walls 16, a first pore size 12 disposed at one side, and a second pore size 14 disposed at an opposite side, wherein said second pore size is greater than said first pore size.

Figure 5:
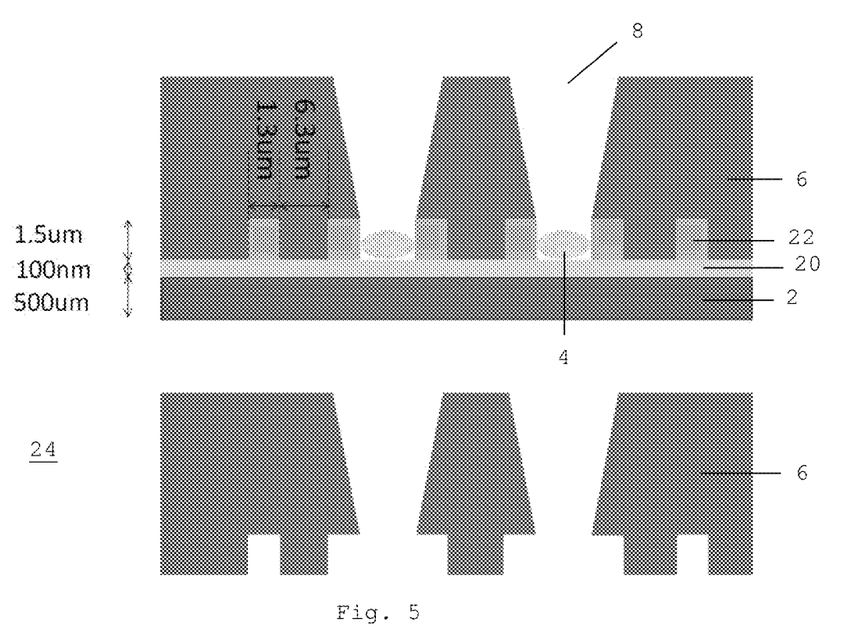
FIG. 5 is a schematic diagram depicting the formation of a porous nickel membrane.

FIG. 5 is a schematic diagram depicting the formation of a porous nickel membrane 24. A cathode substrate 2 comprising a plain metal sheet with a smooth and flat surface has disposed thereon, a conductive seed layer 20 and a patterned conductive layer 22. Evolution of hydrogen bubbles 4 during the electroplating process led to the formation of non-conductive regions on the cathode substrate surface 2. Patterned layer 22 is configured to provide a shape for confining the bubble 4 therein. A nickel layer 6 is then deposited on seed layer 20. However, nickel deposition is prevented in areas covered by the patterned layer 20 and bubble 4. After a desired membrane thickness has been formed, the conductive seed layer 20 and patterned layer 22 are removed, leaving behind the membrane 24 having tapered pores 8 wherein the shape of the pore opening is based on the patterned layer 22.

Figure 7:
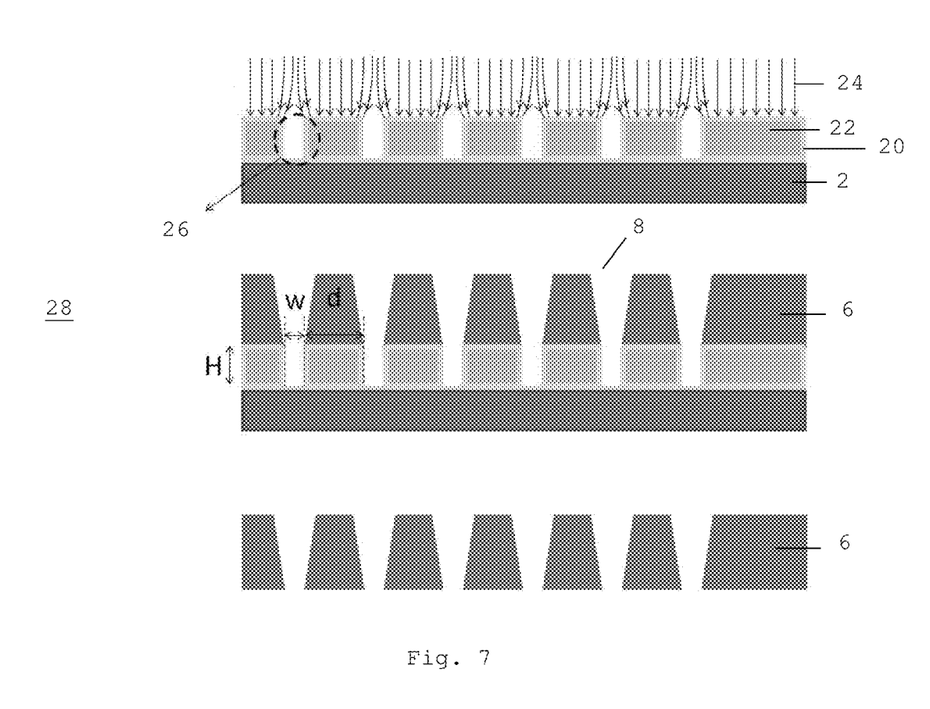
FIG. 7 is a schematic diagram depicting the formation of a porous nickel membrane by using a patterned conductive layer with high aspect ratio.

FIG. 7 is a schematic diagram depicting the formation of a porous nickel membrane 28 by using a patterned conductive layer 22 with a high aspect ratio (d/H is more than 3). A cathode substrate 2 comprising a plain metal sheet with a smooth and flat surface, and further comprising a disposed patterned conductive layer 22 coated with a conductive seed layer 20 on said cathode substrate 2, is used for electroplating to fabricate a porous Ni membrane 28. A nickel layer 6 is deposited on the exterior regions of the patterned conductive layer 22, thereby forming pores 8, after which the conductive seed layer 20 and patterned conductive layer 22 are removed. During electroplating, the electric field lines 24 are deflected and terminate at the top peripheral edges of the patterned conductive layer 22. The electroplating proceeds at the top surface with faster growth upward and near the edge of the patterned conductive layer 22, resulting in a region 26, where the electric field lines are low or zero.

FIG. 10 is a schematic diagram depicting the formation of a porous nickel membrane 30 by using a patterned layer 22 with a low aspect ratio. A cathode substrate 2 comprising a plain metal sheet with a smooth and flat surface, and further comprising a disposed patterned conductive layer 22 and a conductive seed layer 20 on said cathode substrate 2, is used for electroplating to fabricate a porous Ni membrane 30. If the electroplating is conducted for a long period of time, the porous Ni membrane 30 has a first pore size 12 disposed at one side, and a second pore size 14 disposed at an opposite side, wherein said first pore size is greater than said second pore size.

EXAMPLES

Non-limiting examples of the invention and a comparative example will be further described in greater detail by reference to specific Examples, which should not be construed as in any way limiting the scope of the invention.

Example 1

Method A

The evolution of hydrogen bubbles is largely influenced by electrochemical factors, namely the type of electroplated metal, the bath composition, the pH of the solution, the current density employed, the temperature of the solution and the cathode current efficiency (CCE). Accordingly, in this example, the various factors are explored.

One of the main factors influencing the evolution of hydrogen is the chemical nature of the electrode inside the bath solution. Different metals demonstrate different levels of electrocatalysis. Furthermore, electroplating at acidic conditions with increased $H^+$ discharge reactions leads to the formation of a greater number of pores on the metallic surface.

The Ni electroforming was performed in this example using a commercial plating system from Technotrans microform.200 with a Ni sulfamate bath solution of pH 3.5 and a temperature of 50° C., without the use of organic additives, as depicted in FIG. 1. Exemplary electroplating conditions are provided in Table 1 below.

TABLE 1

| Parameter | Value |
| --- | --- |
| Nickel sulfamate (Ni(SO$_3$NH$_2$)$_2$) (g/l) | 380 |
| Nickel (g/l) | 3-89 |
| Boric acid (H$_3$BO$_3$) (g/l) | 5-55 |
| pH | 3.5-3.7 |
| Temperature (° C.) | 52-54 |
| Current density (A/dm$^2$) | 4-15 |

The experimental conditions that led to pore generation while electroplating at optimum conditions of low stress, high flatness, minimal grain size for plating, and high uniformity over large areas are: 1) a pH range of from, 3.5 to 3.0, where the pore density was observed to increase rapidly with decreasing pH; and 2) current density. It was observed that a current density of 5 A/dm$^2$ is the lowest stress allowed for electroplating. However, for large areas and thick membrane layers of more than 100 µm, this current density results in a long plating time of typically about 10 hours for a 100 µm thick membrane covering an 8" area. Consequently, it would be more advantageous to increase the current density, while maintaining the thickness of the membrane below 100 µm. The resultant membranes are typically no thicker than 50 µm, and require a plating time of about 2 hours for a plating area of 4", and 6 hours for a plating area of 8". In general, the formation of a thicker membrane was facilitated by a lower current density. It was also observed that a low stress for electroplating was achieved at a current density of between 4 A/dm$^2$ to 15 A/dm$^2$.

The electroplating process requires a constant plating rate to maintain a uniform growth of the electrodeposit element onto the substrate. This was realized by employing a constant current rather than a constant voltage power supply between anode and cathode. The plating growth rate is the rate at which the thickness of the electroplated material is increasing according to time, thickness/time or µm/s. This is controlled by the amount of the constant current applied between anode and cathode. The speed of plating can be represented by plating growth rate as mm/s or by plating current density or total applied current/total plating area; I/A (A/dm$^2$).

For manufacturing purposes of the membranes, there are four important characteristics that define the membrane performances and commercial values: the pore density, the pore uniformity, the pore dimension and the pore shape.

Statistical measurements were carried out on these parameters and the most influential parameters that control these characteristics were identified.

The pore density is mainly controlled by pH. Changing the pH from 3 to 3.3 to 3.5 changed the pore density from 10% to as high as 60% to 90%.

The pore size is mainly controlled by current density considering all other parameters remain constant. Changing the current density from 11.46 A/dm$^2$ equivalent to 2.35 µm/min to 56.3 A/dm$^2$ equivalent to 11.54 µm/min reduced the pore sizes from 10 µm to 1 µm.

Figure 2:
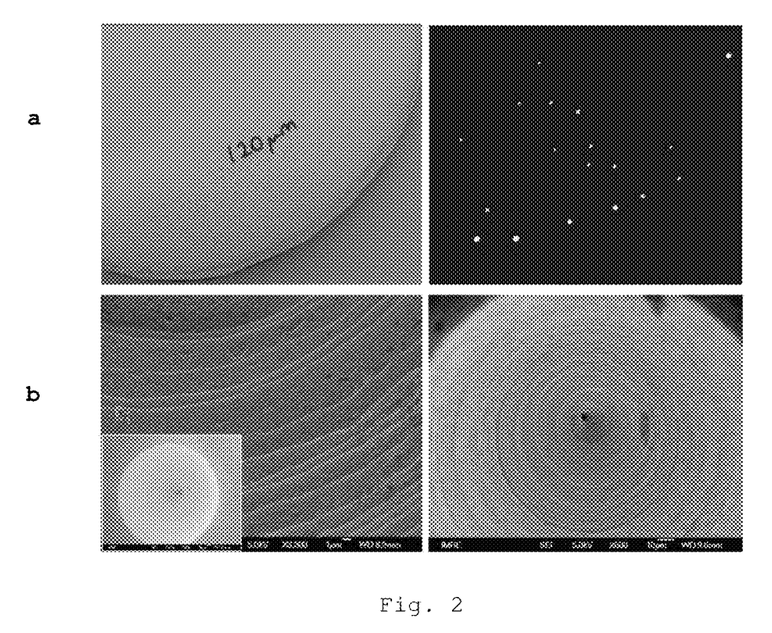
FIG. 2a is an optical micrograph depicting the porous nickel membrane generated in Example 1 on a plated Ni disk with 4" wafer scale.
FIG. 2b is a SEM image showing the side wall of a pore channel of the porous nickel membrane generated in Example 1.

FIG. 2a is an optical micrograph depicting the top view of the porous nickel membrane generated in this example on a plated Ni disk with 4" wafer scale at 11.46 A/dm$^2$ (2.35 µm/min). Scanning electron microscopic (SEM) images showing the side wall of a pore channel of the generated porous nickel membrane is shown in FIG. 2b. The pore channel extends through the membrane and has an opening having a size of about 2 mm in diameter disposed on one side of the membrane and an opening having a size of about 1 µm in diameter on the opposite side of the membrane. The inset shows the top view of the pore channel from the end with the larger opening. The dark spot in the middle of the inset is the 1 µm opening on the other side.

The pore generation relies on $H_2$ bubbles and if the conditions for electroplating chemical reactions such as concentration of ions at the site and time of $H_2$ generation, the temperature uniformity and stability, the electric field uniformity, the flow rate, and the template surface characteristics all remain exactly the same, the bubbles will be generated all with the same sizes. However, the current density has a limit depending on the template conductive surface. If the current passes a certain limit, the surface of the template burns and turns black. For example, for membranes having a conductive seed layer, e.g. Au (50 nm)/Cr (20 nm) conductive seed layer as will be described in method B below, the current density should not be more than limit of 65 A/dm$^2$ equivalent to 12 µm/min.

It was further found that the generation of bubbles was dependent on the local electric field strength i.e., the higher the electric field strength, the more focused the field lines. That is, the footprints of the field lines become more focused and consequently, the generated bubbles become smaller. This ultimately leads to smaller pore sizes.

In order to quantify this control mechanism on pore sizes, measurements were carried out at different electric field strengths. The strategy that was adopted was to decrease the area of plating rather than increasing the magnitude of applied external voltage. This is a better approach because the electric field lines remain highly parallel and uniform, especially at the center. Thus, by confining the area, the uniformity of the electric field lines is guaranteed, while the electric field strength is increased. Moreover, control of the electric field is more precise because of the high resolution of the microfabrication techniques.

Figure 4:
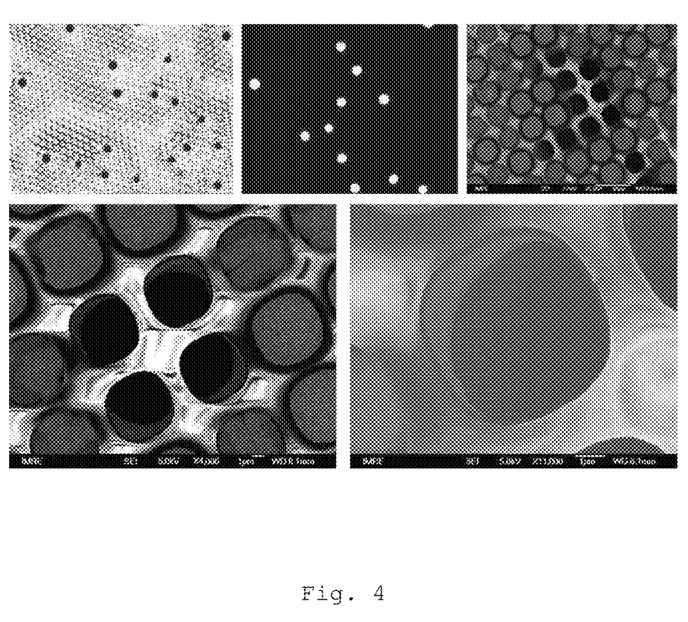
FIG. 4 shows SEM images of the porous nickel membrane fabricated in Example 1 with rectangular pores 2×2 $\mu m^2$ in 100 µm thick nickel membranes.

Accordingly, a high electric field strength associated with a plating current of 56.3 A/dm$^2$, which is equivalent to 11.54 μm/min, was used to fabricate the porous nickel membrane. FIG. 4 shows SEM images of the fabricated porous nickel membrane with rectangular pores 2×2 μm$^2$ in 100 μm thick nickel membranes.

Example 2

Method B

Electroplating was used along with the lithographic patterning technique to create pores within the patterned conductive layer comprising of different shapes, dimensions and defined geometries, as depicted in FIG. 5.

The first step comprises of coating of a silicon wafer with a conductive seed layer for electroplating. A layer of Cr (20 nm) was used as an adhesion promoter for Au (50 nm) while the conductive seed layer was sputter coated on the silicon wafer. Other metals such as NiV, and Cu were also used in place of Au.

The second step involves patterning a non-conductive layer on the smooth flat cathode surface. UV lithography was carried out to create the desired patterns on the surface of the silicon wafer. For high resolution nano-scale patterning, other resists and/or lithographic techniques can be used.

The third step involves the Ni electroplating step, which was carried out using a DC current at low pH to create favorable conditions for the formation of non-conductive regions on the cathode substrate surface due to the generation of hydrogen.

Figure 6:
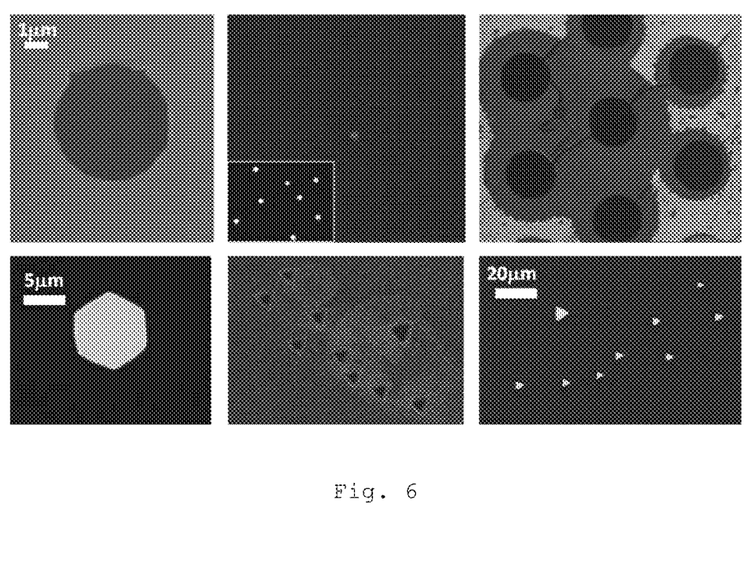
FIG. 6 shows SEM images and optical micrographs depicting the porous nickel membrane generated in Example 2 having pores with circular, hexagonal and triangular cross sections.

FIG. 6 shows a SEM and an optical micrograph depicting the porous nickel membrane generated in this example having pores with circular, hexagonal and triangular cross sections.

Accordingly, the geometry and size of the pores was controlled by the surface pattern design in this example.

Example 3

Method C

This method involves using a patterned conductive layer with a high aspect ratio, as depicted in FIG. 7. Due to the more rapid growth of electroplating at the side walls than the bottom of the pore channel, the side walls impinge at the top before the bottom can escape, thereby resulting in conical-shaped voids. If the aspect ratio is very high, the pore channels form semi-closed conductive surfaces that prevent the electric field lines from penetrating them.

Figure 8:
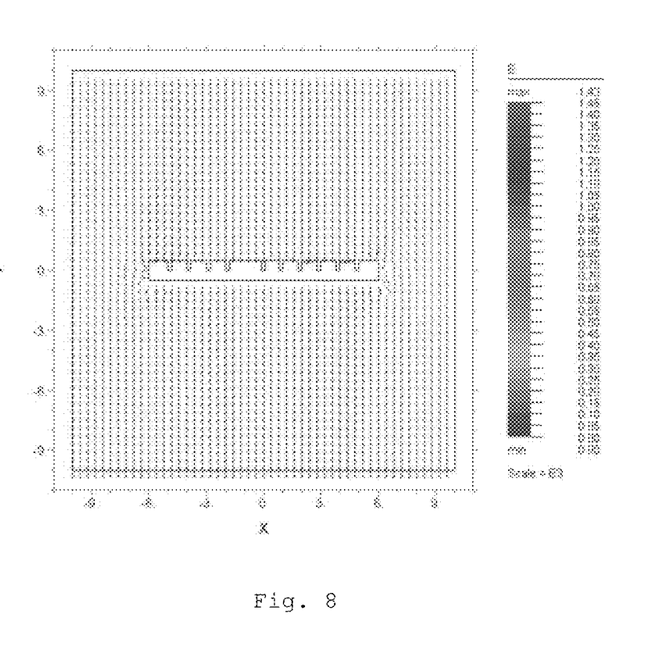
FIG. 8 is a simulation conducted in Example 3 of the distribution of an electric field when a metal template comprising patterned trenches is placed in a uniform external electric field.

FIG. 8 is a simulation plot of the distribution of an electric field when a Ni porous membrane comprising of trenches with high aspect ratios was placed in a uniform external electric field. The simulation shows that the electric field inside the trenches is zero. In addition, it illustrates that if the aspect ratio of the trenches is more than 3, the conductive surface of the deep trenches repels the electric field lines towards the outer surfaces. The electric field lines would be deflected and would terminate at the top peripheral edges of the patterns. The electroplating proceeds at the top surface with faster growth upward and near the edges of the patterns. This leads to V-shaped patterns moving outwards from the interior regions where the electric field lines are low or zero.

After electroplating to the desired thickness, the membrane with well-defined pores can be delaminated. Since the membrane and template have a planar interface with each other and have minimal adhesion, they are easily separated with minimal defects to the fabricated porous membrane.

Figure 9:
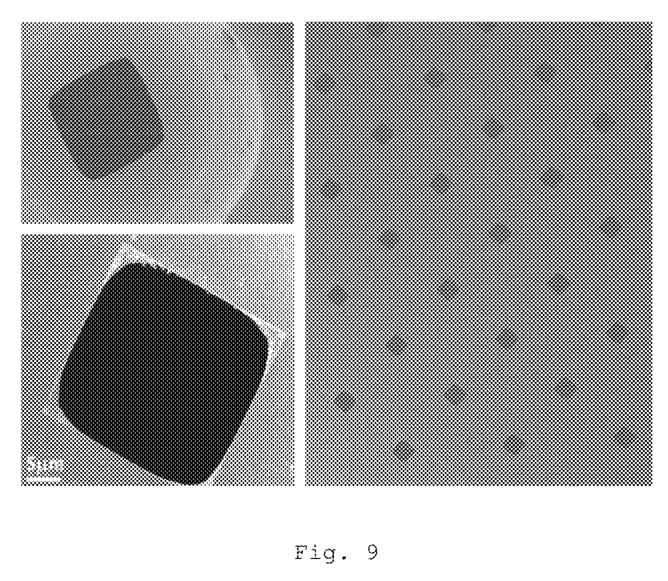
FIG. 9 shows SEM images of the porous nickel membrane fabricated in Example 3 with rectangular pores 2×2 $\mu m^2$ in 100 µm thick Ni membranes.

FIG. 9 shows SEM images of the porous nickel membrane fabricated in this example with rectangular pores 2×2 μm$^2$ in 100 μm thick Ni membranes.

Example 4

Method D

Large resist patterns with low aspect ratio can also be created on a conductive seed layer surface. Using electroplating conditions of low $H_2$ formation, i.e. high pH conditions, Ni deposition will take place on the exposed conductible areas. In addition to the $H_2$ non-conductive regions, the resist areas will also not support Ni deposition reactions and voids will be created.

If the plating is conducted for an adequate period of time, these voids will gradually become smaller in size due to overplating. By controlling the plating time, the terminal pore size can be defined.

This method is depicted in FIG. 10 which shows the fabrication of a conical shaped porous membrane by overplating on large area patterns.

Example 5

Method E

To produce arrays of pores with small dimensions, a patterned template with properties that concentrate the electric field lines into particular spots can be used. Such a substrate consists of dense arrays of needle-shaped Si tips. The sharp needles serve to concentrate the electric field on the sharp tips. As a result, the electroplating current density will increase at the tips with most reactions taking place at the sharp tips. Consequently, generation of the bubbles will be directed and promoted on the sharp tips. Hence, the tips provide conditions to generate the bubbles at the sharp tips and the ability to produce high density porous membranes with dimensions in sub 100 nm scales.

Example 6

Membrane Characterization

The porous metal membranes produced by Methods A, B and C above were characterized in this example. The results are summarized in table 2.

TABLE 2

| Membrane type | Minimum Pore Size (μm) | Pore Uniformity* | Pore Density** | Area |
|---|---|---|---|---|
| Method A | 20 to 0.05 | 10% to 70% | 10% to 70% | 8" and larger |
| Method B | 3.0 to 0.02 | 90% | 10% to 70% | 8" and larger |
| Method C | 3.0 to 0.02 | 90% | 10% to 70% | 8" and larger |

*Pore size refers to the largest pore in the membrane through which a particle can pass; determined by SEM measurements.
**Pore density was measured by placing a membrane sample under a scanning electron microscope (SEM) and physically counting the number of pores per unit area. The stated percentage values refer to the percentage of surface area on the membrane surface covered by pores.

APPLICATIONS

The disclosed method for preparing a metallic porous membrane is particularly advantageous for preparing membranes having customized pore geometry and dimensions. In particular, it has been shown that the tapered pore channels disclosed herein allow good selectivity without compromising the flux of the membrane. Through the control of electroplating parameters, the disclosed method also advantageously prepares porous membranes of high pore uniformity, thereby reducing or eliminating the risk of contaminants entering the filtrate. These porous metal membranes can be used in reverse osmosis, ultrafiltration, or gas separation. In addition, they may be used for the removal of pathogens or particulates from water or food samples.

It will be apparent that various other modifications and adaptations of the invention will be apparent to the person skilled in the art after reading the foregoing disclosure without departing from the spirit and scope of the invention and it is intended that all such modifications and adaptations come within the scope of the appended claims.

The invention claimed is:

1. A method of forming a metallic layer having pores extending therethrough, the method comprising the steps of:
    (a) contacting a surface of a cathode substrate with an electrolyte solution comprising at least one cation;
    (b) reducing said cation to deposit the metallic layer on the surface of said cathode substrate; and
    (c) generating a plurality of non-conductive regions on the cathode substrate surface during reducing step (b);
    wherein:
    the deposition of the metallic layer is substantially prevented on said non-conductive regions on the cathode substrate surface to thereby form pores extending through the deposited metallic layer; and
    step (c) comprises a step of reducing an electron acceptor species contained within said electrolyte solution to dispose a non-conductive material on the cathode substrate surface to thereby generate said non-conductive regions.

2. The method of claim 1, further comprising maintaining said electrolyte at a pH of between 3.0 to 3.5.

3. The method of claim 1, further comprising passing a constant current flow through said electrolyte, and optionally providing a localized current density at said cathode of between 1 to 60 A/dm$^2$.

4. The method of claim 1, further comprising maintaining a constant concentration of said cations in the electrolyte solution.

5. The method of claim 1, wherein said electron acceptor is a hydrogen-generating species or wherein said electron acceptor is a hydrogen ion.

6. The method of claim 1,
    wherein said cation is selected from monovalent, divalent, trivalent or tetravalent ions of a metallic material selected from the group consisting of gold, palladium, platinum, silver, molybdenum, titanium, cobalt, copper, nickel, zinc, brass, solder and alloys thereof; or
    wherein said cation is divalent nickel.

7. The method of claim 1, further comprising a step of disposing at least one patternable material on said cathode substrate surface, said material being patterned to cooperate with the non-conductive material to define a desired pore geometry.

8. The method of claim 7, further comprising a step of removing the patterned material after deposition of the metallic layer.

9. The method of claim 1, wherein said cathode substrate surface is an uneven surface, said uneven surface comprising needle-like projections having a diameter of less than 100 nm.

10. The method according to claim 1, wherein said generating step (c) comprises a step of providing a patterned conductive layer on said cathode substrate surface, wherein the patterned conductive layer comprises a plurality of trench features having an aspect ratio of at least 3, and wherein the patterned conductive layer optionally comprises a resist layer substantially coated with a conductive seed layer.

11. The method of claim 10, further comprising a step of removing the patterned conductive layer after deposition of the metallic layer.

12. The method of claim 1, wherein said generating step (c) comprises a step of providing a patterned, non-conductive layer on said cathode substrate surface, said non-conductive layer being a resist layer having an aspect ratio of less than 1.

13. The method of claim 1, wherein the non-conductive material is a hydrogen bubble.

* * * * *